Feb. 28, 1967          T. D. McMAHON          3,305,903
TIRE SAFETY STRAPPING CONSTRUCTION
Filed Dec. 7, 1965
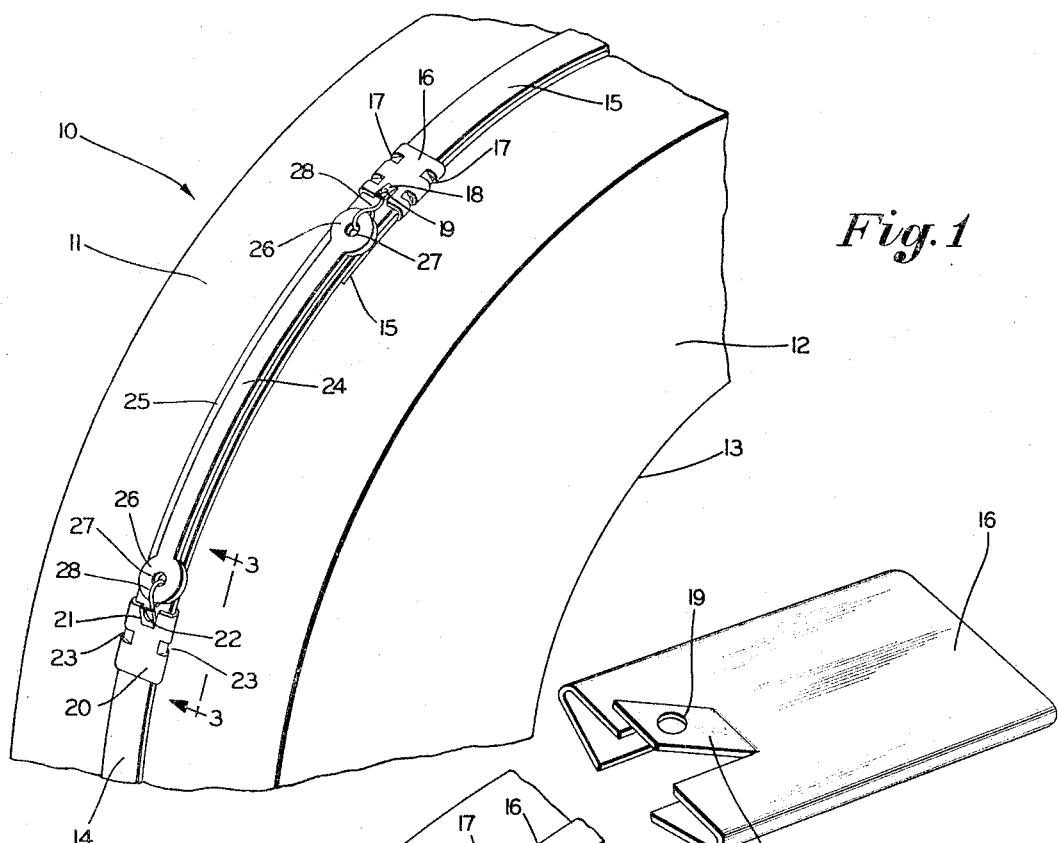
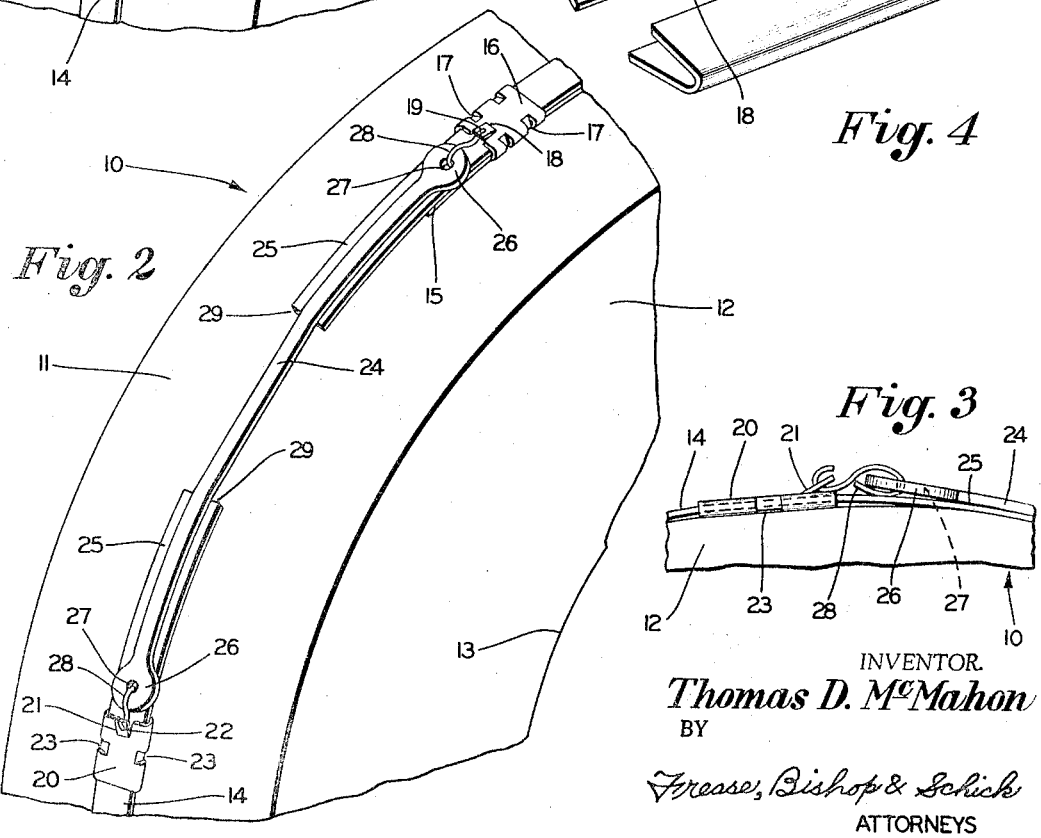
INVENTOR.
*Thomas D. McMahon*
BY
*Freese, Bishop & Schick*
ATTORNEYS & # United States Patent Office 3,305,903
Patented Feb. 28, 1967

3,305,903
TIRE SAFETY STRAPPING CONSTRUCTION
Thomas D. McMahon, Warren, Ohio, assignor to Sharon Steel Corporation, Sharon, Pa., a corporation of Pennsylvania
Filed Dec. 7, 1965, Ser. No. 512,169
10 Claims. (Cl. 24—1)

My invention relates to improvements in tire safety strapping construction, and more specifically to a strapping construction used for being tensioned circumferentially around a portion of the tread area of relatively large off-the-road tires in order to spread the tire beads to facilitate mounting, which strapping construction includes snubber means for preventing ends of the strapping from whipping during the cutting of the tensioned strapping, yet which relieves the tension in the strapping when cut and permits subsequent safe complete removal of the strapping from the tire.

For some years past, manufacturers of relatively large tires, such as off-the-road tires, which may vary in diameter from approximately four to ten feet, have supplied these tires to the ultimate user with a steel strap tensioned extending circumferentially around a central portion of the tread area of the tire in order to maintain the tire beads transversely spread, and thereby facilitate the mounting of the tires on the wheels by the ultimate user. By radially compressing the tread area portion and maintaining the tire beads spread, the operation of forcing the beads over the wheel rim is greatly simplified and the beads are maintained properly seated on the wheel rim during the initial inflation of the tire.

Obviously, during a particular stage of the tire mounting operation, it is necessary to cut these tensioned steel straps from tires in order to remove the straps and complete the mounting and inflation of the tires. In view of the fact that the tension in the strap is retaining the tire resiliently compressed, immediately at the time of cutting the strap from the tire, the resilient force of the tire as well as the inherent tension in the strap causes the cut ends of the strap normally to whip outwardly away from the tire, thereby endangering personnel required to perform this operation and resulting in many serious injuries to workmen.

It is, therefore, a general object of the present invention to provide tire safety strapping construction which eliminates the difficulties and dangers as discussed above.

It is a primary object of the present invention to provide tire safety strapping construction which includes the conventional strap as discussed above, and in addition, includes resilient snubber means extending over a particular portion of the circumferential length of the strap so that the strap may be cut adjacent the snubber means and the snubber means will prevent the cut ends of the strap from whipping outwardly away from the tire.

It is a further object of the present invention is provide tire safety strapping construction of the foregoing type in which circumferentially spaced strapping seals may be used engaged with the strap for securing ends of the resilient snubber means and defining the part of the strap within which the strap cutting may safely take place, and at the same time, at least one of these seals securing the resilient snubber means may serve as the seal maintaining the strap tensioned about the tire tread area.

It is still a further object of the present invention to provide tire safety strapping construction of the foregoing type in which the circumferentially spaced seals used for securing the ends of the resilient snubber means to the strap may be of a unique construction so that the ends of the snubber means may be removably secured to these seals by simple hook means, and therefore quickly removed after a particular strap cutting operation for ready reuse on another tire.

It is an additional object of the present invention to provide tire safety strapping construction of the foregoing general type in which a part of the strap adjacent the resilient snubber means is preferably always of single thickness strapping so that the cutting of the strap adjacent the snubber means may be quickly and conveniently accomplished.

Finally, it is an object of the present invention to provide tire safety strapping construction which satisfies all of the above objects in a relatively simple and efficient manner, completely eliminates the dangers of cutting the strap tensioned about the tire, yet may be provided at only a slight additional cost.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the tire safety strapping construction comprising the present invention may be stated as including a conventional length of strapping extending completely circumferentially around a portion of the tread area of a tire and secured preferably by seal means tensioned radially compressing the tire tread area portion. Furthermore, the invention includes a resilient snubber extending circumferentially along a portion of the strap with means securing the snubber ends to the strap. Thus, with this construction, the strap may be cut adjacent and circumferentially between the snubber ends, and the resiliency of the snubber will allow the strap tension to be relieved while preventing the cut ends of the strap from whipping outwardly away from the tire.

More specifically, the invention may include the seal means retaining the strap tensioned around the tire also serving as one of the anchoring points for securing one end of the snubber, with similar seal means being circumferentially spaced from the first seal means and engaged with the strap to serve as the anchoring point for securing the other end of the snubber. Also, the strap may be of conventional flat exposed surface area form and the seal means may secure the snubber overlying the strap, the seal means may be formed with angularly radially outwardly extending tabs to which the snubber ends may be removably secured through hook means, and the seal means and snubber may be positioned on the strap such that a single thickness part of the strap is located circumferentially between the two seal means for convenient cutting of the strap at this single thickness part.

By way of example, an embodiment of the improved tire safety strapping construction is illustrated in the accompanying drawings forming a part hereof, wherein like numerals indicate similar parts throughout the several views, and in which:

FIG. 1 is a fragmentary side perspective view of a tire, illustrated somewhat diagrammatically, having the tire safety strapping construction of the present invention installed thereon and retaining a central portion of the tire tread area radially compressed for illustrating the manner in which the tires are supplied to the ultimate user;

FIG. 2, a view similar to FIG. 1 but with the strap of the tire safety strapping construction cut intermediate the resilient snubber ends and the resilient snubber retaining the cut ends of the strapping against the tire tread area portion and free of whipping outwardly away from the tire;

FIG. 3, an enlarged fragmentary side elevation looking in the direction of the arrows 3—3 in FIG. 1; and FIG. 4, an enlarged top perspective view of one of the preferred strapping seals forming a part of the construction of the present invention.

As illustrated in the drawings, the tire, generally indicated at 10, may be of any conventional form, preferably of the off-the-road type, and usually varying in diameter from approximately four to ten feet. Further, the tire 10, being of conventional form, includes the circumferentially continuous and transversely extending tread area 11, side wall area 12 and terminates radially inwardly in the beads 13.

The embodiment of the tire safety strapping construction of the present invention illustrated includes a preferably transversely flat strap 14 having the overlapped ends 15 and being circumferentially tensioned so as to radially compress a central part of the tire tread area 11. This strap 14 may be of conventional form, usually from conventional steel strapping, and, for use with off-the-road tires varying in diameter from approximately four feet to ten feet, will have dimensions of approximately two inches in transverse width and 0.050″ thickness.

The overlapped ends 15 of strap 14 are secured for retaining the strap positioned and tensioned as described by a preferably steel strapping seal 16 which, for the main part, is generally of usual construction formed transversely around the strap overlapped ends 15 and having the preferably four deformed portions 17 to accomplish the securing. For the additional important purposes of the present invention, seal 16 is also formed with the preferably integral, circumferentially and angularly radially outwardly extending tab 18 having the engagement opening 19 formed therethrough, as shown enlarged in FIG. 4 and prior to the seal 16 being deformed.

Spaced circumferentially from seal 16 along the strap 14 is a second seal 20 which is of merely reversed substantially identical construction to the first seal 16 having the substantially identical tab 21 with the engagement opening 22. As stated, seals 16 and 20 are merely of reverse substantially identical construction and are positioned circumferentially spaced along the strap 14 with the tab projecting sides thereof facing, and the second tab 21 preferably encompasses a single thickness of the strap 14, being secured to the strap merely by two deformed portions 23, all as clearly shown in FIG. 1.

Thus, seals 16 and 20 are positioned spaced apart circumferentially along the strap 14 with the seal 16 retaining the strap overlapped ends 15 secured and the strap 14 tensioned about the tire tread area 11. The seal 20 is merely secured to the strap 14 in the particular circumferential position but is at a part of the strap which is of merely single thickness, that is, spaced from the strap overlapped ends 15, thereby resulting in a part of the strap 14 between the seals 16 and 20 being of single thickness.

As best seen in FIGS. 1 and 3, an elongated resilient material snubber 24, preferably formed of rubber or plastic, is positioned overlying the substantially flat exposed surface 25 of the strap 14 extending the major part of the circumferential distance between the seals 16 and 20. Snubber 24 is preferably formed with the enlarged circular ends 26 each having an engagement opening 27 formed therethrough.

Preferably steel wire hooks 28 are engaged through the engagement openings 27 of the snubber ends 26 and through the engagement openings 19 of the respective engagement openings 19 and 22 in the seal tabs 18 and 21. Thus, these hooks 28 secure the ends 26 of the snubber 24 to the seals 16 and 20 and it is preferred that in the secured position of the snubber 24 with the strap 14 in a tensioned condition, the snubber will be retained slightly tensioned sufficient to retain the hooks 28 securely engaged with the respective seals 16 and 20.

As shown in FIG. 1, but best seen in FIG. 3, it is also preferred that the hooks 28 will be formed so as to be permanently engaged with the snubber ends 26, but preferably removably engaged with the seal tabs 18 and 21. In this manner, the snubber 24 can be reused for a series of different straps 14 and tires 10 after the function of the present invention has been accomplished for each tire.

After the tire 10, retained with the beads 13 transversely spread by the tensioned strap 14, has been properly mounted on a wheel rim (not shown) and the tire has been partially inflated, the single thickness part of the strap 14 adjacent the snubber 24, that is, circumferentially between the seals 16 and 20, may be cut in the conventional manner without disturbing the snubber 24 as clearly shown in FIG. 2, and the cut ends 29 will spread circumferentially apart, thereby relieving the tension in the strap 14 and the major part of the compression against the tire tread area 11, while at the same time, the snubber 24, being resilient material, will be stretched circumferentially and will retain the strap cut ends 29 against the tire tread area 11 so as to prevent outward whipping of these cut ends. With the tension in the strap 14 relieved, the strap can be quickly disengaged from the tire 10 and the snubber 24 disengaged from the seals 16 and 20 for later reuse if desired.

Thus, according to the principles of the present invention a tire safety strapping construction is provided which eliminates the danger to personnel previously encountered when straps tensioned circumferentially around tires are cut for the removal thereof.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

I claim:

1. Tire safety strapping construction including a strap extending completely circumferentially around a portion of the tread area of a tire, means securing the strap tensioned radially compressing the tire tread area portion, a resilient snubber extending circumferentially along a portion of the strap and having ends, and means securing the snubber ends to the strap; whereby, the strap may be cut adjacent the snubber at a location circumferentially between the snubber ends, and the resiliency of the snubber will allow the strap tension to be relieved while preventing the cut ends of the strap from whipping.

2. Tire safety strapping construction as defined in claim 1 in which the strap is substantially flat transversely forming a substantially flat exposed surface; and in which the means securing the snubber ends secures the snubber overlying the strap exposed surface.

3. Tire safety strapping construction as defined in claim 1 in which the means securing the snubber ends to the strap includes portions of a pair of circumferentially spaced seals secured to the strap; and in which the snubber ends are secured to the seal portions.

4. Tire safety strapping construction as defined in claim 1 in which the means securing the snubber ends to the strap includes portions of a pair of circumferentially spaced seals secured to the strap, a tab connected to each seal portion, and means connecting one of the snubber ends to each of the seal tabs.

5. Tire safety strapping construction as defined in claim 1 in which the strap has circumferentially overlapped ends;

in which the means securing the snubber ends to the strap includes portions of a pair of circumferentially spaced seals secured to the strap; in which at least one of the seals is secured around the strap overlapped ends and a portion thereof is the means securing the strap tensioned radially compressing the tire tread area portion; and in which the snubber ends are secured to the seal portions forming at least a part of the means securing the snubber ends.

6. Tire safety strapping construction as defined in claim 1 in which the strap has circumferentially overlapped ends; in which the means securing the snubber ends to the strap includes portions of a pair of circumferentially spaced seals secured to the strap; in which one of the seals is secured around the strap overlapped ends and a portion thereof is the means securing the strap tensioned radially compressing the tire tread area portion; in which the snubber ends are secured to the seal portions forming at least a part of the means securing the snubber ends; and in which the strap is of single thickness over a part of the circumferential distance between the seals adjacent the snubber.

7. Tire safety strapping construction as defined in claim 1 in which the strap has circumferentially overlapped ends; in which the means securing the snubber ends to the strap includes portions of a pair of circumferentially spaced seals secured to the strap, a tab connected to each seal portion, and means connecting one of the snubber ends to each of the seal tabs; and in which at least one of the seals is secured around the strap overlapped ends and a portion thereof is the means securing the strap tensioned radially compressing the tire tread area portion.

8. Tire safety strapping construction as defined in claim 1 in which the strap has circumferentially overlapped ends; in which the means securing the snubber ends to the strap includes portions of a pair of circumferentially spaced seals secured to the strap, a tab connected to each seal portion, and means connecting one of the snubber ends to each of the seal tabs; in which at least one of the seals is secured around the strap overlapped ends and a portion thereof is the means securing the strap tensioned radially compressing the tire tread area portion; in which the strap is substantially flat transversely forming a substantially flat exposed surface; and in which the means connecting one of the snubber ends to each of the seal tabs secures the snubber overlying the strap exposed surface.

9. Strapping seal construction for use in sealing transversely around a strap longitudinally tensioned extending circumferentially around a tire and engageable by a resilient snubber to prevent cut ends of the strap from whipping when cut; the seal construction including a band-like seal extending transversely around a circumferential portion of the strap, deformed portions on the seal securing the seal around the strap and against longitudinal movement relative to the strap, and means formed on the seal for engagement by an end of a resilient snubber extending longitudinally along a circumferential portion of the strap to anchor said snubber end to the strap.

10. Strapping seal construction as defined in claim 9 in which the means formed on the seal for engagement by an end of a resilient snubber is a tab connected to the seal extending longitudinally of the strap and angularly radially outwardly away from the strap; and in which there is means on the tab spaced radially from the strap for being secured to the snubber end.

References Cited by the Examiner
UNITED STATES PATENTS

| | | | |
|---|---|---|---|
| 2,746,107 | 5/1956 | Mahn | 24—23 |
| 2,765,841 | 10/1956 | Lydle | 157—1.21 |
| 2,799,328 | 7/1957 | Pitman | 157—1.21 |
| 2,886,099 | 5/1959 | Bishman | 157—1.21 |

WILLIAM FELDMAN, *Primary Examiner.*

MILTON S. MEHR, *Examiner.*